(12) United States Patent
Carter, Jr. et al.

(10) Patent No.: US 10,388,053 B1
(45) Date of Patent: Aug. 20, 2019

(54) SYSTEM FOR SEAMLESS ANIMATION TRANSITION

(71) Applicant: Electronic Arts Inc., Redwood City, CA (US)

(72) Inventors: Ben Folsom Carter, Jr., Longwood, FL (US); Fabio Zinno, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 79 days.

(21) Appl. No.: 15/081,490

(22) Filed: Mar. 25, 2016

Related U.S. Application Data

(60) Provisional application No. 62/139,219, filed on Mar. 27, 2015.

(51) Int. Cl.
*G06T 13/80* (2011.01)
*A63F 13/53* (2014.01)

(52) U.S. Cl.
CPC .............. *G06T 13/80* (2013.01); *A63F 13/53* (2014.09)

(58) Field of Classification Search
None
See application file for complete search history.

(56) References Cited

U.S. PATENT DOCUMENTS

| | | | |
|---|---|---|---|
| 5,548,798 A | 8/1996 | King | |
| 5,982,389 A * | 11/1999 | Guenter | G06T 13/40 345/474 |
| 5,999,195 A * | 12/1999 | Santangeli | G06T 13/80 345/473 |
| 6,961,060 B1 | 11/2005 | Mochizuki et al. | |
| 7,403,202 B1 * | 7/2008 | Nash | G06T 13/40 345/474 |
| 8,154,544 B1 | 4/2012 | Cameron et al. | |
| 8,281,281 B1 | 10/2012 | Smyrl et al. | |
| 8,395,626 B2 | 3/2013 | Millman | |
| 8,599,206 B2 | 12/2013 | Hodgins et al. | |

(Continued)

OTHER PUBLICATIONS

Seo et al., "Compression and Direct Manipulation of Complex Blendshape Models", Dec. 2011, in 10 pgs.

(Continued)

*Primary Examiner* — Xiao M Wu
*Assistant Examiner* — Steven Z Elbinger
(74) *Attorney, Agent, or Firm* — Knobbe, Martens, Olson & Bear LLP

(57) ABSTRACT

Embodiments of systems disclosed herein reduce or eliminate artifacts or visible discrepancies that may occur when transitioning from one animation to another animation. In certain embodiments, systems herein identify one or more pose or reference features for one or more objects in a frame of a currently displayed animation. Although not limited as such, often the one or more objects are characters within the animation. Systems herein can attempt to match the reference features for the one or more objects to reference features of corresponding objects in a set of potential starting frames for a second animation that is to start being displayed. The potential starting frame with reference features that are an acceptable match with the current frame of the current animation may be selected as a starting frame for playing the second, animation potentially resulting in a smoother transition than starting from the first frame.

21 Claims, 7 Drawing Sheets

(56) References Cited

U.S. PATENT DOCUMENTS

| | | | |
|---|---|---|---|
| 8,860,732 B2 | 10/2014 | Popovic et al. | |
| 9,741,146 B1 | 8/2017 | Nishimura | |
| 9,826,898 B1 | 11/2017 | Jin et al. | |
| 9,984,658 B2 | 5/2018 | Bonnier et al. | |
| 9,990,754 B1 | 6/2018 | Waterson et al. | |
| 10,022,628 B1 | 7/2018 | Matsumiya et al. | |
| 10,096,133 B1 | 10/2018 | Andreev | |
| 2002/0180739 A1 | 12/2002 | Reynolds et al. | |
| 2004/0227760 A1 | 11/2004 | Anderson et al. | |
| 2004/0227761 A1 | 11/2004 | Anderson et al. | |
| 2006/0149516 A1 | 7/2006 | Bond et al. | |
| 2006/0262114 A1 | 11/2006 | Leprevost | |
| 2007/0085851 A1 | 4/2007 | Muller et al. | |
| 2007/0097125 A1 | 5/2007 | Xie et al. | |
| 2008/0049015 A1* | 2/2008 | Elmieh | G06T 13/20 345/420 |
| 2008/0152218 A1 | 6/2008 | Okada | |
| 2008/0316202 A1 | 12/2008 | Zhou et al. | |
| 2009/0066700 A1 | 3/2009 | Harding et al. | |
| 2009/0315839 A1 | 12/2009 | Wilson et al. | |
| 2010/0134501 A1* | 6/2010 | Lowe | G06T 13/40 345/474 |
| 2010/0251185 A1 | 9/2010 | Pattenden | |
| 2011/0012903 A1* | 1/2011 | Girard | G06T 13/40 345/474 |
| 2011/0086702 A1 | 4/2011 | Borst et al. | |
| 2011/0119332 A1 | 5/2011 | Marshall et al. | |
| 2011/0128292 A1 | 6/2011 | Ghyme et al. | |
| 2011/0164831 A1 | 7/2011 | Van Reeth et al. | |
| 2011/0292055 A1 | 12/2011 | Hodgins et al. | |
| 2012/0303343 A1 | 11/2012 | Sugiyama et al. | |
| 2012/0313931 A1 | 12/2012 | Matsuike et al. | |
| 2013/0120439 A1* | 5/2013 | Harris | G11B 27/034 345/619 |
| 2013/0121618 A1 | 5/2013 | Yadav | |
| 2013/0222433 A1 | 8/2013 | Chapman et al. | |
| 2013/0235045 A1* | 9/2013 | Corazza | G06T 13/40 345/473 |
| 2013/0263027 A1 | 10/2013 | Petschnigg et al. | |
| 2014/0002463 A1 | 1/2014 | Kautzman et al. | |
| 2014/0198106 A1 | 7/2014 | Sumner et al. | |
| 2014/0198107 A1 | 7/2014 | Thomaszewski et al. | |
| 2015/0113370 A1* | 4/2015 | Flider | G06F 17/211 715/204 |
| 2015/0187113 A1 | 7/2015 | Rubin et al. | |
| 2015/0235351 A1 | 8/2015 | Mirbach et al. | |
| 2015/0243326 A1* | 8/2015 | Pacurariu | G11B 27/031 386/280 |
| 2016/0026926 A1 | 1/2016 | Yeung et al. | |
| 2016/0071470 A1 | 3/2016 | Kim et al. | |
| 2016/0217723 A1 | 7/2016 | Kim et al. | |
| 2016/0314617 A1 | 10/2016 | Forster et al. | |
| 2016/0354693 A1 | 12/2016 | Yan et al. | |
| 2017/0301310 A1 | 10/2017 | Bonnier et al. | |
| 2017/0301316 A1 | 10/2017 | Farell | |
| 2018/0043257 A1 | 2/2018 | Stevens | |

OTHER PUBLICATIONS

Le, Y. et al., "Motion Fields for Interactive Character Animation", University of Washington, Bungie, Adobe Systems, 8 pgs, obtained Mar. 20, 2015.
Levine S. et al., "Continuous Character Control with Low-Dimensional Embeddings", Stanford University, University of Washington, 10 pgs, obtained Mar. 20, 2015.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Belytschko et al., "Assumed strain stabilization of the eight node hexahedral element," Computer Methods in Applied Mechanics and Engineering, vol. 105(2), pp. 225-260 (1993), 36 pages.
Belytschko et al., Nonlinear Finite Elements for Continua and Structures, Second Edition, Wiley (Jan. 2014), 727 pages (uploaded in 3 parts).
Chao et al., "A Simple Geometric Model for Elastic Deformations", 2010, 6 pgs.
Cook et al., Concepts and Applications of Finite Element Analysis, 1989, Sections 6-11 through 6-14.
Cournoyer et al., "Massive Crowd on Assassin's Creed Unity: AI Recycling," Mar. 2, 2015, 55 pages.
Dick et al., "A Hexahedral Multigrid Approach for Simulating Cuts in Deformable Objects", IEEE Transactions on Visualization and Computer Graphics, vol. X, No. X, Jul. 2010, 16 pgs.
Diziol et al., "Robust Real-Time Deformation of Incompressible Surface Meshes", to appear in Proceedings of the 2011 ACM SIGGRAPH/Eurographics Symposium on Computer Animation (2011), 10 pgs.
Geijtenbeek, T. et al., "Interactive Character Animation using Simulated Physics", Games and Virtual Worlds, Utrecht University, The Netherlands, The Eurographics Association 2011, 23 pgs.
Georgii et al., "Corotated Finite Elements Made Fast and Stable", Workshop in Virtual Reality Interaction and Physical Simulation VRIPHYS (2008), 9 pgs.
Han et al., "On-line Real-time Physics-based Predictive Motion Control with Balance Recovery," Eurographics, vol. 33(2), 2014, 10 pages.
Irving et al., "Invertible Finite Elements for Robust Simulation of Large Deformation", Eurographics/ACM SIGGRAPH Symposium on Computer Animation (2004), 11 pgs.
Kaufmann et al., "Flexible Simulation of Deformable Models Using Discontinuous Galerkin FEM", Oct. 1, 2008, 20 pgs.
Kavan et al., "Skinning with Dual Quaternions", 2007, 8 pgs.
Kim et al., "Long Range Attachments—A Method to Simulate Inextensible Clothing in Computer Games", Eurographics/ACM SIGGRAPH Symposium on Computer Animation (2012), 6 pgs.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs.
Levine, S. et al., "Continuous Character Control with Low-Dimensional Embeddings", Stanford University, University of Washington, 10 pgs.
Macklin et al., "Position Based Fluids", to appear in ACM TOG 32(4), 2013, 5 pgs.
McAdams et al., "Efficient Elasticity for Character Skinning with Contact and Collisions", 2011, 11 pgs.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

(56) References Cited

OTHER PUBLICATIONS

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Treuille, A. et al., "Near-optimal Character Animation with Continuous Control", University of Washington, 2007, 7 pgs.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Wu et al., "Goal-Directed Stepping with Momentum Control," Eurographics/ ACM SIGGRAPH Symposium on Computer Animation, 2010, 6 pages.
Dudash, Bryan. "Skinned instancing." NVidia white paper (2007).
Hernandez, Benjamin, et al. "Simulating and visualizing real-time crowds on GPU clusters." Computación y Sistemas 18.4 (2014): 651-664.
McDonnell, Rachel, et al. "Clone attack! perception of crowd variety." ACM Transactions on Graphics (TOG). vol. 27. No. 3. ACM, 2008.
Musse, Soraia Raupp, and Daniel Thalmann. "Hierarchical model for real time simulation of virtual human crowds." IEEE Transactions on Visualization and Computer Graphics 7.2 (2001): 152-164.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
Ruiz, Sergio, et al. "Reducing memory requirements for diverse animated crowds." Proceedings of Motion on Games. ACM, 2013.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Ulicny, Branislav, and Daniel Thalmann."Crowd simulation for interactive virtual environments and VR training systems." Computer Animation and Simulation 2001 (2001 ): 163-170.
Vigueras, Guillermo, et al. "A distributed visualization system for crowd simulations." Integrated Computer-Aided Engineering 18.4 (2011 ): 349-363.
Anagnostopoulos et al., "Intelligent modification for the daltonization process", International Conference on Computer Vision Published in 2007 by Applied Computer Science Group of digitized paintings.
Andersson, S., Goransson, J.: Virtual Texturing with WebGL. Master's thesis, Chalmers University of Technology, Gothenburg, Sweden (2012).
Avenali, Adam, "Color Vision Deficiency and Video Games", The Savannah College of Art and Design, Mar. 2013.
Badlani et al., "A Novel Technique for Modification of Images for Deuteranopic Viewers", May 2016.
Fikkan, Eirik. Incremental loading of terrain textures. MS thesis. Institutt for datateknikk og informasjonsvitenskap, 2013.
Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.
Klein, Joseph. Rendering Textures Up Close in a 3D Environment Using Adaptive Micro-Texturing. Diss. Mills College, 2012.

\* cited by examiner

SYSTEM FOR SEAMLESS ANIMATION TRANSITION

RELATED APPLICATIONS

This application claims priority to U.S. Provisional Application No. 62/139,219, filed on Mar. 27, 2015 and titled "SYSTEM FOR SAMPLE-BASED MOTION SYNTHESIS," which is hereby incorporated herein by reference in its entirety for all purposes. Further, this application hereby incorporates by reference herein in its entirety for all purposes U.S. application Ser. No. 15/081,528 filed on Mar. 25, 2016 and titled "SYSTEM FOR EXAMPLE-BASED MOTION SYNTHESIS."

BACKGROUND

Many video games allow a user to control an image that represents a character within a video game environment. For example, sports games will often let a user control a representation of a player on a field and first person shooters will often let the user control a representation of a shooter within a hostile environment. Some video games will include a number of image or graphics files and/or video files to display the different animations that may occur as a result of the user's interaction with the video game. The greater the variety of movement that is possible within the video game, the more images or animations that may be included in the video game data resulting in a greater amount of required storage space. This need for storage may be exacerbated if the video game includes alternative views of the character.

Some video games reduce the storage required for the graphics or video files by generating animations based on motion capture data. Using features or reference points of an in-game character and motion capture data included with the video game, an animation can be generated that reflects motion of the in-game character. However, as user interactions with the in-game character are unpredictable and as there may be numerous possibilities of interactions, the animation is not always smooth. For example, an interaction with the in-game character could cause a change in movement that may result in a change in the animation that may appear less than realistic to a user. Further, interactions between the in-game character and other characters or the environment may make the programmed animation appear less realistic to a user.

SUMMARY OF EMBODIMENTS

The systems, methods and devices of this disclosure each have several innovative aspects, no single one of which is solely responsible for the all of the desirable attributes disclosed herein. Details of one or more implementations of the subject matter described in this specification are set forth in the accompanying drawings and the description below.

In certain embodiments, a computer-implemented method is disclosed that may be implemented by an interactive computing system configured with specific computer-executable instructions. The method may include at least receiving an animation change trigger request indicating to change a currently displayed animation. Further, the method may include identifying a new animation based at least in part on the animation change trigger and the currently displayed animation. In addition, the method may include determining a plurality of eligible start frames for the new animation and identifying reference features for a current frame of the currently displayed animation. Further, the method may include selecting a start frame from the plurality of eligible start frames based at least in part on the reference features for the current frame and corresponding reference features from each eligible start frame from the plurality of eligible start frames. Moreover, the method may include transitioning the currently displayed animation to the new animation beginning with the selected start frame.

In other embodiments, a system comprising an electronic data store configured to store animation frames with respect to an application is disclosed. The system may further include a hardware processor in communication with the electronic data store. Further, the hardware processor may be configured to execute specific computer-executable instructions to at least receive an animation change trigger to transition from a first animation to a second animation. The first animation may be an animation that is currently being displayed. Further, the system can identify the second animation based at least in part on the animation change trigger and the first animation. Moreover, the system may identify a reference feature for a displayed frame of the first animation. In addition, the system may identify a set of start frames for the second animation from a set of animation frames of the second animation stored in the electronic data store. Further, the system may compare the reference feature for the displayed frame with a corresponding reference feature for each start frame from the set of start frames to obtain a comparison result for each start frame from the set of start frames. In addition, the system can select a start frame based on the comparison result for each start frame from the set of start frames.

Yet other embodiments disclosed herein relate to a non-transitory computer-readable storage medium storing computer executable instructions that, when executed by one or more computing devices, configure the one or more computing devices to perform operations comprising detecting an animation change trigger to transition from a first animation to a second animation. The first animation may be an animation that is currently being displayed. The operations may further include identifying the second animation based at least in part on the animation change trigger and identifying a set of reference features for a displayed frame of the first animation. In addition, the operations may include identifying a set of start frames for the second animation, and selecting a start frame from the set of start frames based at least in part on the set of reference features and a corresponding set of reference features for each start frame of the set of start frames.

In certain embodiments, a computer-implemented method is disclosed that may be implemented by an interactive computing system configured with specific computer-executable instructions. The method may include at least determining an initial position of a character displayed in a video game and determining a target pose for the character. Further, the method may include detecting that a collision with the character has occurred in the video game. In response to detecting the collision, the method may include updating a ragdoll representation of the character associated with the initial position of the character to obtain a final pose based at least in part on the target pose and the collision. Further, the method may include extracting a set of reference features from the final pose and identifying a motion capture frame from a set of motion capture frames as a match to the set of reference features. Moreover, the method may include causing the motion capture frame to be output for display in the video game.

In other embodiments, a system comprising an electronic data store configured to store motion capture frames with respect to an application is disclosed. Further, the system may include a hardware processor in communication with the electronic data store. The hardware processor may be configured to execute specific computer-executable instructions to at least determine a target pose for a character displayed in the application. The system may further be configured to detect an external force applied to the character in the application. In response to detecting the external force, the system may obtain a final pose of the character based at least in part on the target pose and the external force. In addition, the system can extract at least one reference feature from the final pose and select a motion capture frame from a set of motion capture frames stored at the electronic data store as a match to the at least one reference feature. Further, the system can output the motion capture as a current frame in an animation.

Yet other embodiments disclosed herein relate to a non-transitory computer-readable storage medium storing computer executable instructions that, when executed by one or more computing devices, configure the one or more computing devices to perform operations comprising determining a target pose for a character displayed in an application and detecting an external force with respect to the character in the application. In response to detecting the external force, the operations may further include obtaining a final pose of the character based at least in part on the target pose and the external force. Moreover, the operations may include extracting a reference feature from the final pose and selecting a motion capture frame from a set of motion capture frames based at least in part on a match with the reference feature. In addition, the operations may include designating the motion capture as a current frame in an animation.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF EMBODIMENTS

Introduction

Figure 1:
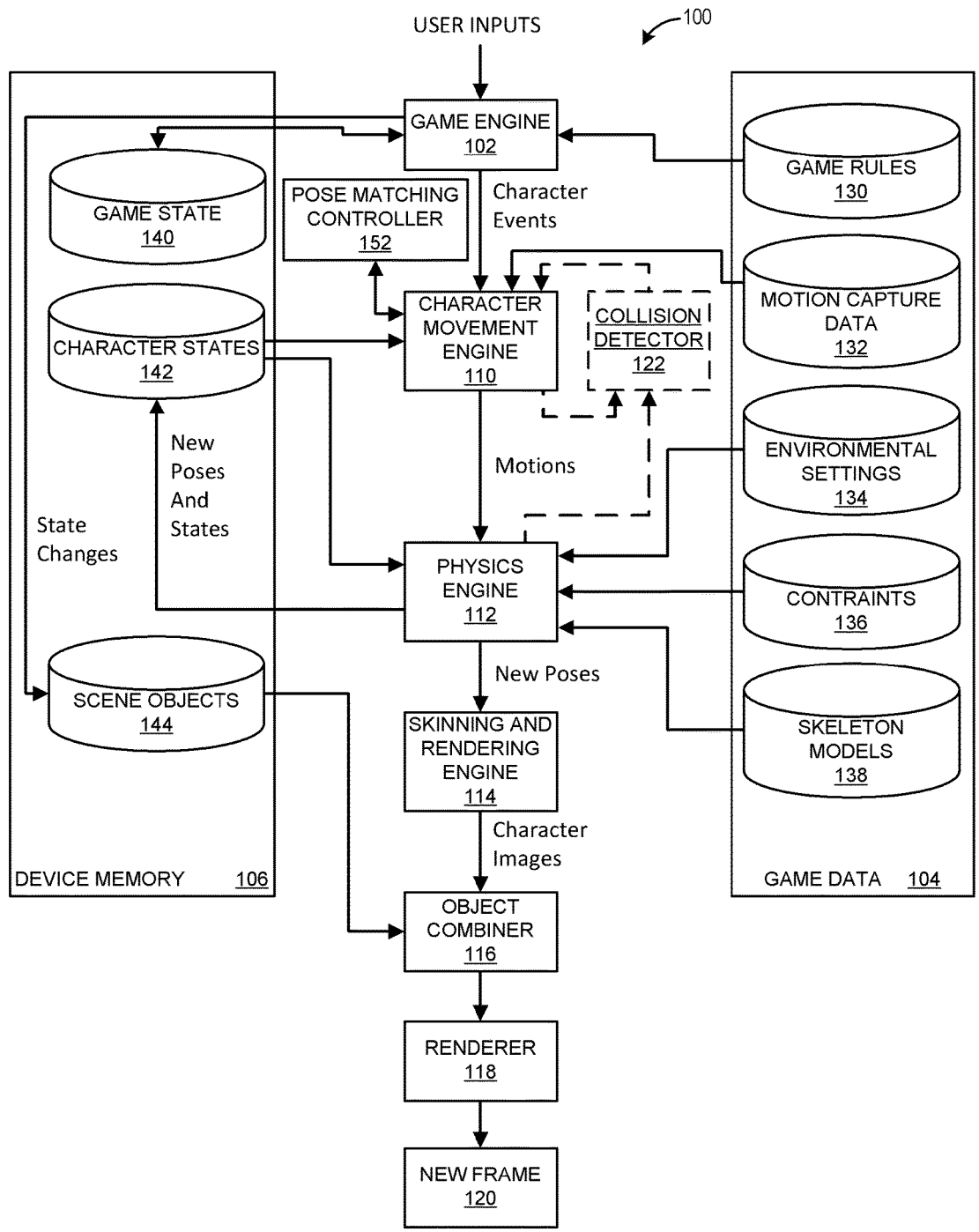
FIG. 1 illustrates an embodiment of elements of a video game system.

Many applications use animation, to present a scene to a user. For example, many videogames will use animation to display a result of an action with, respect to a character. For instance, when an event within the game results in a character's death or incapacitation, an animation may be presented to the user that illustrates the character's death or incapacitation. As another example, when a user achieves a goal within the game, the game may present a victory animation to the user. In some videogames, at least some of the animations may be created using motion capture technology. By using motion capture technology, more lifelike animations can be created compared to other animation techniques.

Some videogames may have a large number of motion capture-based animations. For example, some videogames may have hundreds or even thousands of animations. Thus, some applications may require a large amount of non-volatile storage space to be allocated to store the animations included in the applications. Moreover, some videogames may have events that trigger context-specific animations. For example, some videogames may have an animation depicting a character's defeat that is specific to the character's position within an environment at a point in time when the character is defeated. Thus, there may be hundreds of animations devoted specifically to the illustration of the character's defeat. Creating the vast number of animations can be time-consuming and, as previously stated, may use a relatively large amount of nonvolatile storage space. In some cases, the pre-generated animations may be referred to as "canned" animations.

One solution to help reduce the number of canned animations that are included in an application is to use procedural animation. Procedural animation may include generating an animation in, response to a trigger within an application based on a plurality of stored animation frames, which may be created using motion capture techniques. However, in some cases, procedural animations may not look lifelike because, for example, there are insufficient stored animation frames and/or the frames selected using the procedural animation technique do not blend smoothly.

Embodiments of systems and processes disclosed herein use example-based procedural animation techniques to create smooth, lifelike animations. Systems herein can identify a character pose at the end of each game update frame. This character pose identified at the end of each game update frame may be different from the expected pose determined based on the current animation displayed as a result of the calculations performed by the physics engine. The character pose determined at the end of each game update frame may be referred to as a "final pose". The systems described herein can extract features from the final pose that may be used to identify a specific motion capture frame to use in generating an animation. Extracting features may include identifying information associated with the features. These features may include joint rotations expressed with quaternions, coordinates of points on a skeleton or on a model mesh, or any geometric feature that may be used to capture or identify distinctive features of the pose. In some embodiments, a particular portion of the final pose may be used to identify the particular motion capture frame to use in generating the animation. For example, a polygon formed by the joints at the shoulder, elbow, and wrist of the final pose of a character may be used to identify the particular motion capture frame in a set of potential motion capture frames for use in the animation.

By comparing the extracted features, the systems can identify a specific motion capture frame within a repository of motion capture animation clips that matches closest to the final pose. In cases where more than one motion capture frame matches the final pose within the same degree, additional selection algorithms can be used to select the motion capture frame from a plurality of matching motion capture frames included in the repository of motion capture animation clips. For example, some of the features may be weighted more than others. Thus, although two motion capture frames may match the final pose, one of the two motion capture frames may better match the features with the higher weight value and thus, may be selected over the other motion capture frame.

Once a motion capture frame is selected, it may be used or provided as a target pose for a subsequent game update frame or a subsequent animation frame. Advantageously, in certain embodiments disclosed herein, a number of context specific animations may be generated. By generating the context-specific animation, the amount of data storage required by a video game may be reduced compared to video games that include pre-generated animations for each possible animation within the video game. Further, a greater diversity of animations may be used in a video game using the embodiments disclosed herein compared to video games that are limited to pre-generated animations that are provided with the video game when published.

Further, certain, embodiments disclosed herein reduce or eliminate artifacts or visible discrepancies that may occur when transitioning from one animation to another animation. In some embodiments, systems herein identify one or more pose or reference features for one or more objects in a frame of a currently displayed animation. Although not limited as such, often the one or more objects are characters within the animation. Systems herein can attempt to match the reference features for the one or more objects to reference features of corresponding objects in a set of potential starting frames for a second animation that is to start being displayed. The potential starting frame with reference features that have the smallest difference with the current frame of the current animation may be selected as a starting frame for playing the second animation.

Advantageously, in some embodiments, by dynamically selecting a starting frame instead of using a default or predetermined starting frame, artifacts caused by transitioning between two animations may be reduced or eliminated, thereby improving the quality of animations displayed to a user. In some embodiments, animations are interactive. For example, in an attempt to tackle a player in a football video game, a user may move a first character from one position to another position that includes a second character causing the first character to tackle the second character. In this example, there may exist a transition between a walking animation and a running animation. Further, there may exist a transition between a running animation and a tackling animation. In certain embodiments, improving the quality of the animations displayed to the user by, for example, reducing or removing artifacts that may occur during animation transitions, the video game may be made more accurate.

Although primarily described with respect to a video game, it should be understood that similar advantages may be obtained with respect to other applications that include animations. For example, embodiments disclosed herein may be used to make training simulators (such as, for example, simulators used by the military or first responders) more accurate compared to systems that do not use the transition features described herein.

Although this disclosure focuses on video games, it should be understood that embodiments described herein can be used with other types of software applications. For example, an educational application, a training application, or a help guide within an application may each use one or more embodiments of the present disclosure.

Overview of Video Game System Embodiments

FIG. 1 illustrates embodiments of some elements of a video game system 100. In particular, FIG. 1 illustrates embodiments of elements involved in execution of gameplay within a game application. The game application may be executed by a user computing device, such as that described below with respect to FIGS. 6 and 7. The game system 100 may receive user input to control aspects of the game according to game rules 130. Game rules 130 may be specified in instruction form on game media. Examples of game rules 130 include rules for scoring, possible inputs, actions/events, movement in response to inputs, and the like. Other components can control what inputs are accepted and how the game progresses, and other aspects of gameplay. The elements in FIG. 1 illustrate elements used for generating and rendering animation within the game based on various inputs.

As shown in FIG. 1, by system 100, user inputs and game code/data may be used to generate display video. The game system also handles playing the game and presenting corresponding audio output. The description of FIG. 1 is focused on generating frames of display video for the game. A game engine 102 receives the user inputs and determines character events, such as actions, collisions, runs, throws, attacks and other events appropriate for the game.

The character events are conveyed to a character movement engine 110 that determines the appropriate motions the characters should make in response to the events. Further, the character movement engine 110 may generate a character pose that can be passed directly or provided to a skinning and rendering engine 114 or to a physics engine 112 for further processing. This generated character pose may be referred to as the "target pose." The physics engine 112 tracks the target pose by, for example, calculating the torques and forces necessary to make the ragdoll representation of the character follow the target pose. In calculating the torques and forces for making the ragdoll representation of the character follow the target pose, the physics engine 112 may account for or incorporate external forces and collision constraints in its calculations. A muscle system inside or communicating with the physics engine 112 may account for forces that a representation of muscles associated with the character, or its ragdoll representation, may apply in attempting to follow the target pose. By accounting for the representation of the muscles associated with the character, the physics engine 112 can determine how closely the target pose will be followed by the ragdoll. Muscle tensions for the character can be tweaked to follow the target pose loosely or closely. The physics engine 112 may generate the final character pose that may be provided to the skinning and rendering engine 114. The skinning and rendering engine 114 in turn provides character frames to an object combiner 116 to combine animate, inanimate, and background objects into a full scene. The full scene is conveyed to a renderer 118, which generates a new frame 120 therefrom.

Game code/data 104 is shown comprising game rules 130, prerecorded motion capture poses/paths 132, environmental settings 134, constraints 136 (such as strength and velocity constraints), and skeleton models 138. The device executing the game might have memory 106 for game state 140, character states 142 and scene object storage 144. Character states 142 can comprise storage for a current pose of characters being animated.

During operation, the game engine 102 reads in game rules 130 and considers game state 140 to arrive at character events. Character movement engine 110 reads in prerecorded poses/paths from a motion capture data repository 132 as well as character states 142. The motion capture data repository 132 can store motion capture clips in the form of marker positions and/or a hierarchy of relative joint orientations. The pose for each frame within the collection of animation clips may be uniquely identified by a corresponding hierarchy of relative joint orientations. An optional collision detector engine 122 can detect collisions generated by the physics engine 112 and alert the game engine to the collisions, which may result in the triggering of specific game events. Further, the detection of collisions may result in a recalculation of the final pose by the physics engine 112.

In some embodiments, the character movement engine 110 can work in conjunction with the physics engine 112 to create a procedural animation. In some such embodiments, the physics engine 112 may generate a final pose for an object or character that differs from the target pose, in response to, for example, a collision detected by the collision detector 122. The character pose may be generated on a frame-by-frame basis and can be based at least in part on one or more physics rules implemented by the physics engine 112. For example, the final pose may be based at least in part on the target pose provided by the character movement engine 110 and the impact of a collision force and/or a gravitational value. The character movement engine 110 can use the final pose to identify a motion capture frame included in the motion capture data 132, which may be provided as the target pose for the next frame in the procedural animation. The strength of the muscles determined by the physics engine 112 may be used to determine how closely the new target pose will be followed when generating the subsequent frame. Advantageously, in certain embodiments, using the final pose to select a motion capture frame and updating the target pose for the next frame update based on the selected motion capture frame enables more fluid procedural animation compared to pre-existing processes. Further, the use of procedural animation can result in a larger variety of animation within a game while reducing storage space for the game data 104 of a game. In certain embodiments, one or more of the game engine 102, the character movement engine 110, the physics engine 112, and the collision detector 122, among other systems may be configured to execute the processes discussed below with respect to FIGS. 2-4. Further, in certain embodiments, portions of the system 100 may be utilized to perform some or all of the process described with respect to FIG. 5. However, as described below, a separate computing system may be used to execute the process described with respect to FIG. 5 to create the motion capture data repository 132.

As needed, character movement engine 110 may also use other data elements shown, such as skeleton models 138, also referred to as rigs. Rigs are often used in character animations. A typical rig may comprise a collection of character components, such as a skeletal structure and a mesh to be skinned over the skeletal structure. A typical rig comprises a skeletal structure for a character and includes a plurality of degrees of freedom. A rig may also comprise a set of animation controls that enable an animator to move the various components of the character in order to create motion in an animation. Character movement engine 110 might also introduce character movements for randomness, personality, and so forth.

In certain embodiments, the character movement engine 110 provides a target pose based on, game rules. For example, the game logic may select an, animation to be played, and a current frame of the animation may dictate the target pose. The physics engine 112 can receive the target pose as an input and can calculate the forces and torques to make the ragdoll representation follow the target pose. The strength of the muscles of the ragdoll may determine how closely the target pose is followed by the ragdoll when generating the procedural animation. Further, the physics engine 112 may modify the calculation of the path followed by the ragdoll based at least in part on external forces and/or collision constraints that occur with respect to the character in the video game. Thus, in some cases, even with strong muscles, the target pose may not be reached if, for example, a collision occurs or there is an obstacle in the path of one or more of the character's limbs.

The pose matching controller 152 can identify one or more frames from an animation to display based on how well a character pose from one animation matches a character pose from another animation. For example, the pose matching controller 152 can identify a number of pose features or reference features from a character in a particular animation, or a current frame from the particular animation, and determine the difference between the pose features and corresponding pose features from frames of a second animation. In some embodiments, a particular frame of an animation is compared to one or more frames from another animation. For example, upon receiving a trigger to change animations, the pose matching controller 152 may compare a current frame and/or a subsequent frame to one or more frames of a new animation to be displayed. The frame from the second animation with pose features that has the smallest difference compared to the pose features of the particular animation may be selected as a start frame when transitioning from the particular animation to the second animation. Advantageously, in certain embodiments, the pose matching controller 152 enables animations to appear smoother or more realistic compared to systems that start subsequent animations at the same start frame each time and/or without accounting for the frame of a the current animation when transitioning to a new animation.

The skinning and rendering engine 114 takes into account the surfaces, colors and textures of the body parts of posed characters and renders character images. Object combiner 116 can then combine the character images with inanimate and background objects obtained from scene objects store 114 to provide a complete scene to renderer 118.

Example Example-Based Motion Synthesis Relating to a Collision Event

Figure 2:
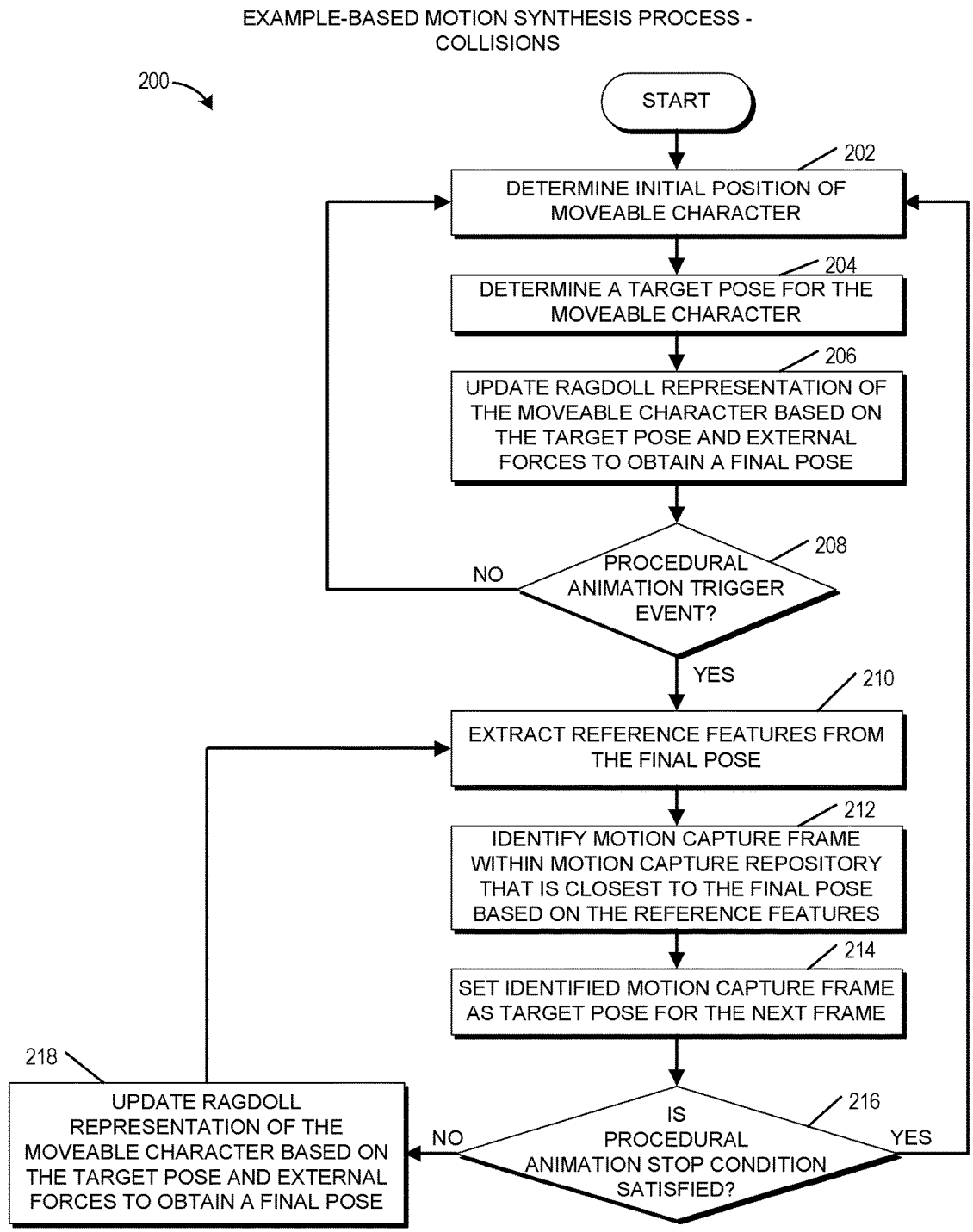
FIG. 2 presents a flowchart of an embodiment of a sample-based motion synthesis process relating to a collision event.

FIG. 2 presents a flowchart of an embodiment of an example-based motion synthesis process 200 relating to a collision event. The process 200 can be implemented by any system that can generate a procedural animation by continuously selecting a anew motion capture frame from a motion capture animation database on a frame by frame basis. The selection process can include identifying the "example" motion capture frame in the motion capture database that is closest to the final pose generated by the physics engine 112. The selected motion capture frame may be used as the target pose for the next frame update. The process 200 can be implemented, in whole or in part, by, for example, a game engine 102, a pose matching controller 152, a character movement engine 110, a collision detector 122, a physics engine 112, or a motion capture data repository 132, among others. Although any number of systems, in whole or in part, can implement the process 200, to simplify discussion, the process 200 will be described with respect to particular systems. Further, although embodiments of the process 200 may be performed with respect to any type of movable game object, to simplify discussion, the process 200 will be described with respect to a character within the game. This character may be a user controlled character or a non-player character (NPC).

The process 200 begins at block 202 where, for example, the game engine 102 determines an initial position of a movable character. This initial position of the movable character may be or may be based on a final pose of a previous frame. Further, the initial position of the movable character may be based at least in part on an animation clip that is selected by the character movement engine 110 based at least in part on game rules of the video game. This animation clip may be part of an animation selected for display by, for example, the game engine 102. Further, in some embodiments, an animation may transition to a new animation at block 202 using, for example, embodiments of the process disclosed with respect to FIG. 3.

At block 204, the game engine 102 may use the character movement engine 110 to determine the target pose of the movable character. The target pose may be based at least in part on the selected animation clip and/or the initial position of the character. Further, the target pose may be based at least in part on user input received by the game engine 102, At block 206, the physics engine 112 updates a ragdoll representation of the moveable character to follow the target pose. This target pose may be provided as an input to the physics engine 112. Updating the ragdoll representation of the movable character may be based at least in part on the target pose determined at the block 204 and one or more external forces and/or collisions between the moveable character and an object, environment, or other character in the video game. These external forces and/or additional constraints may be provided to the physics engine 112 as an input and/or as part of a constraint matrix. The physics engine 112 may attempt to update the ragdoll representation of the moveable character to satisfy the target pose. However, in some cases, the physics engine 112 may be unable to update the ragdoll representation to match the target pose due, for example, to the constraint matrix and/or physics algorithms used by the physics engine 112 to implement a particular rule or law of physics created for the video game 112, which may or may not match real world physics laws.

In some embodiments, the detection of a collision may result in particular collision constraints being applied to the ragdoll representation of the movable character by the physics engine 112. These collision constraints may be generated by the physics engine 112 in response to the detection of the collision. Generally, the collision constraints may be determined based on the particular physics rules implemented by the physics engine 112. The ragdoll representation of the character may be formed from one or more connected rigid bodies used to represent the character. The physics engine 112 can calculate the forces and torques needed for the ragdoll representation of the character to follow the target pose from a previous pose. The previous pose may include the initial pose and/or a final pose from a previous frame. The physics engine 112 may be modified or tweaked to vary how closely the target pose is followed by modulating the strength of the ragdoll muscles. Stronger muscles applied to the ragdoll representation of the character will follow the target pose more closely than weaker muscles, which will track the movements of portion of the ragdoll, more loosely. The result of the physics engine's 112 attempt to follow the target pose may be used as the final pose for the moveable character. In some embodiments, the updated representation of the moveable character generated at block 206 is output for display to a user as the current frame or as part of the current frame.

At decision block 208, it is determined whether a procedural animation trigger event has occurred. The procedural animation trigger event can include any type of event that can trigger a procedural animation process that causes the selection of example animations from a database or repository of example animations, such as may be included as part of the motion capture data repository 132. In some cases, the procedural animation trigger event may include an in-game event, such as, for example, the detection of a collision or an interaction with an external force, the determination that an in-game character has died, the determination that the in-game character has been knocked down, the determination that the in-game character has been transformed into a new state, a completion of an in-game objective, the failure to complete an in-game objective, and the like. In certain embodiments, the procedural animation trigger event may include a determination that the physics engine 112 was unable to update the ragdoll representation of the moveable character to match the target pose at block 206, or to match the target pose to within a threshold degree. Further, the determination may be based at least in part on differences between reference features of the updated ragdoll representation and the corresponding reference features of the target pose.

The determination of whether a procedural animation trigger event has occurred may be performed by one or more systems based, for example, on the type of the procedural animation, trigger event. For example, a procedural animation trigger event based on certain in-game events, such as a character dying, may be determined by the game engine 102. As another example, the collision detector 122 may determine that the moveable character has been hit or that the moveable character has bumped against an obstacle while in motion. However, a procedural animation trigger event based on whether the physics engine 112 could update the ragdoll representation of the moveable character to match the target pose within a threshold discrepancy may be determined by the physics engine 112.

If it is determined at the decision block 208 that a procedural animation trigger event has not occurred, the process 200 returns to the block 202 where an, animation previously determined by, for example, the game engine 102 at a previous interaction of the block 202 continues to be processed. In some cases, an action by, for example, a user may cause the animation to be transitioned to another animation when returning to the block 202. In other cases, the prior animation continues to be processed and a next frame of the animation may be selected for display as blocks 204 and 206 are, repeated.

If it is determined at the decision block 208 that a procedural animation trigger event has occurred, the procedural animation is performed, as described below with reference to the blocks 210-218, and the process continues to block 210. At block 210, the pose matching controller 152 extracts pose features, which, may be referred to as reference features, from the final pose. Extracting reference features may include extracting information or feature data relating to each of the reference features from the final pose. These reference features may include any of the previously described features of the movable character that may be used to identify the distinctive position and/or movement of the movable character. Further, the information obtained for the reference features may include any information that can be used to identify the distinctive position and/or movement of the movable character and/or to identify a subsequent frame for the character in the procedural animation. For example, the reference features may include joint rotations of particular joints in the skeleton of the movable character. As a second example, the reference features may include coordinates of particular points on the skeleton of the movable character. The reference features may include a variety of different features. Further, different types of features may be used for different portions of the reference.

At block 212, the pose matching controller 152 identifies a motion capture frame within the motion capture data repository 132 that is closest to the final pose based at least in part on the reference features obtained from the final pose. Selecting the motion capture frame may include selecting an example animation from a repository of available sample animations. In some cases, block 212 may include identifying the motion capture frame from a context specific subset of motion capture frames. For example, if the procedural animation event trigger is related to a fall, the motion capture frame may be selected from a fall-related collection of motion capture frames. On the other hand, if the procedural animation event trigger is related to a tackle in a football game, the motion capture frame may be selected from a tackle-related collection of motion capture frames.

In some implementations, the motion capture frame is identified by comparing the reference features, or corresponding information thereof, of the final pose to reference features, or corresponding information thereof of motion capture frames within the motion capture data repository 132. Alternatively, the character movement engine 110 may identify an initial, cluster of motion capture frames within the emotion capture data repository 132 that match or substantially match to a threshold degree with the reference features for the final pose. After a cluster of motion capture frames is identified, the character movement engine 110 may match the reference features of the final pose to the reference features for the motion capture frames within the identified cluster of motion capture frames. Advantageously, yin some embodiments, by using a coarse search to identify a cluster of motion capture frames and then performing a fine search within the identified cluster of motion capture frames, the process associated with the block 212 can be performed more efficiently than a brute force search. In some cases, a motion capture frame may not exist that matches precisely the final pose. In such cases, a character movement engine 110 selects a emotion capture frame that matches to within a threshold degree with the final pose and/or that is the closest match to the final pose.

In some embodiments, block 212 may include calculating a distance between each reference feature of the target pose and of the corresponding reference feature in a motion capture frame. These reference features, as previously described, are not limited in type and may include joint angles, reference point positions, joint angular velocities, and/or reference point velocities. The differences may represent errors in matching the final pose to the motion capture frame. In some cases, the errors may be weighted based on the particular reference feature. The summation and/or weighted average of these errors may be used to determine a similarity between the final pose and the motion capture frame. The motion capture frame with the least cumulative error with respect to the final pose may be selected as the closest motion capture frame to the final pose.

In some embodiments, velocities may be associated with the pose or reference features. For example, if the pose features are joint angles, the joints' angular velocities might be included in the feature set. Likewise, if the features were reference points positions, their linear velocities might be included in the feature set.

At block 214, the motion capture frame identified at block 212 is set as the target pose for the next frame in the procedural animation. At the decision block 216, the game engine 102 determines whether a procedural animation stop condition is satisfied. This procedural animation stop condition can include any condition that indicates that animation has completed or is to cease. For example, the procedural animation stop condition may be based on a location of the character within the environment. For instance, the animation may cease when the updated target pose includes the movable character lying flat on a floor in the environment. As another example of a stop condition, the animation may cease after a period of time. For instance, some games may be configured to display a 10 second knock-out (KO) animation. Thus, the animation may cease after 10 seconds regardless of whether the character is lying flat on the floor of the environment. Another stop condition may include an indication that the video game is to return to a start menu or to cease execution.

If it is determined at decision block 216 that the animation stop condition is satisfied, the process 200 may return to the block 202 and a new canned animation may be selected. Alternatively, the process may end. For example, if the procedural animation stop condition is a command to exit the video game, the process 200 may end. However, if it is determined at decision block 216 that the animation stop condition has not been satisfied, the process continues and at each subsequent frame the process 200 provides a target pose for the next frame.

If it is determined at the decision block 216 that the animation stop condition has not been satisfied, the process continues to the block 218 where the next frame in the animation may be processed as part of the procedural animation. At block 218, the physics engine 112 updates the ragdoll representation of the moveable character to follow the target pose. The target pose generally comprises the motion capture frame set as the target pose in the block 214 as part of processing the prior frame. Subsequent to performing the block 218, the process returns to block 210 where references features from the final pose obtained, at block 218 are extracted and the process continues using one or more of the embodiments previously described.

Advantageously, in certain embodiments, using the process 200, the procedural animation can adapt to collisions that may occur during the animation process. For example, if the character hits a rock as the character is falling, the animation may be modified to reflect the collision with the rock. Thus, embodiments disclosed herein may provide a more realistic simulation in comparison to games that use canned animations. Furthermore, embodiments disclosed herein may use less storage space than applications that attempt to anticipate every in-game situation and provide a motion capture animation for each of the in-game situations.

In some embodiments, the animation trigger at decision block 208 may result in the selection of a new animation. For example, in some embodiments, if the difference between the updated ragdoll representation of the moveable character determined at block 206 and the target pose is greater than a threshold, a new animation may be selected. In some embodiments, the starting frame for the new animation may be selected using the operations previously described with respect to the blocks 210-214. Further, in some embodiments, once the new animation is selected, the process 200 may repeat beginning at block 202. Thus, in some embodiments, the new selected animation may continue being processed by looping through the blocks 202-208. If during processing of the new animation it is determined that a procedural animation trigger event has occurred, the process may proceed to the block 210 as previously described. In some embodiments, the new animation may be selected by comparing reference features of the updated ragdoll representation and corresponding reference features of a plurality of animation clips in the motion capture data repository 132. In some embodiments, selecting the new animation may include performing one or more of the embodiments described below with respect to FIG. 3.

In certain embodiments, the decision block 208 may include multiple thresholds. For example, if a difference between the ragdoll representation of the moveable character and, the target pose is less than a first threshold, the process 200 may return to block 202. If instead the difference is greater than the first threshold, but less than a second threshold, the process 200 may proceed to the block 210. However, if the difference is greater than a second threshold, which is itself greater than the first threshold, the process 200 may include selecting a new animation that includes a start frame that is closer to the target pose than what the physics engine 112 calculated or determined at, the block 206.

In certain embodiments, the process 200 can be used to improve an inverse kinematics (IK) process. For example, the process 200 may be used to predict a joint orientation for a kinematics chain in order for a portion of the character to reach a target. A motion capture image can be identified that matches the predicted joint orientation within a threshold degree. Joint orientation prediction may then be updated based on the selected motion capture image. This procedure can be repeated on a frame by frame basis to provide a more fluid inverse kinematics-based animation.

Transition Events

Some of the previously described embodiments of the pose features matching algorithms can be used to create procedural animations. Further, similar algorithms can be used to improve blending between, different animation clips. For example, suppose a character, is, included in a walking animation and the user requests that the character run. In some cases, the running clip is selected as the new animation and the walking and running animations are blended. Blending the animations can cause artifacts when the legs and feet are not in the same "phase." For example, in some cases when the animation transition request is received, the walking animation might have the right foot planted, but the running animation might start with the left foot planted.

To help address the problem of the resulting artifacts, certain embodiments of the pose matching algorithm described herein can be used to select the frame in the current or running animation that is closer to the current state of the character than the initial frame of the new animation. Thus, returning to the previous example with the right foot planted, instead of automatically starting the running animation from the first frame, the pose matching controller 152 can analyze some or all of the frames of the running animation to find the frame that is closest to the current character configuration and use the identified frame as the starting frame of the running sequence. Thus, in the previous example, the pose matching controller 152 may identify a frame in the running animation that has the right foot planted and may start playing the animation using the identified frame. Moreover, in certain embodiments, the pose matching controller can also account for velocity differences between the reference features in the animations.

Furthermore, when a physics ragdoll is used, the system can use the result of the physics engine 112 calculations (for example, the final pose) to facilitate matching to a motion capture frame in the new animation that matches closest to the current animation. Moreover, by using the physics engine and the process 200, deviations from the original animation may be taken into account when generating the procedural animation.

In addition, in certain embodiments, the transition processes summarized above and described in more detail below can be combined with embodiments of the collisions and/or external forces processes previously described with respect to the process 200.

Example Pose Matching Process

Figure 3:
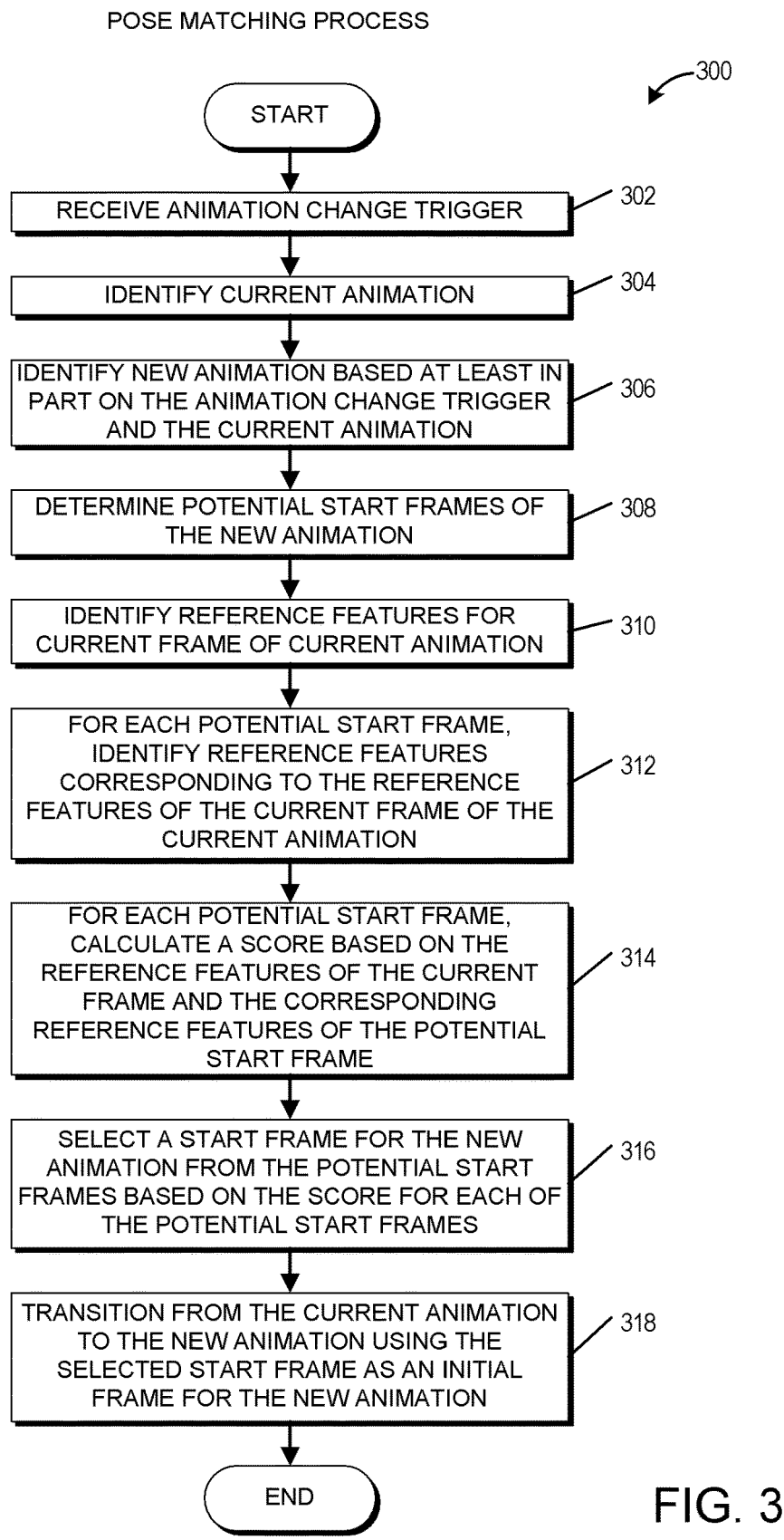
FIG. 3 presented a flowchart of an embodiment of a pose matching process relating to a transition between animations.

FIG. 3 presented a flowchart of an embodiment of a pose matching process 300 relating to a transition between animations. The process 300 can be implemented by any system that can transition from a first animation to a second animation using dynamic start frames of the second animation. Advantageously, in certain embodiments, by dynamically selecting the start frame of the second animation, the transition between animations may be more seamless compared to systems that use static start frames. The process 300 can be implemented, in whole or in part, by, for example, a game engine 102, a pose matching controller 152, a character movement engine 110, a collision detector 122, a physics engine 112, or a motion capture data repository 132, among others. Although any number of systems, in whole or in part, can implement the process 300, to simplify discussion, the process 300 will be described with respect to particular systems. Further, although embodiments of the process 300 may be performed with respect to any type of movable game object, to simplify discussion, the process 300 will be described with respect to a character within the game. This character may be a user controlled character or a non-player character (NPC).

The process 300 begins at block 302 where the game engine 102 receives an animation change trigger. The animation change trigger can include any type of trigger that causes a transition from one animation to another animation. For example, the animation change trigger may be a user input (such as, for example, a change movement rate command, a jump command, a fly command, a swim command, or the like), an in-game event (such as, for example, an objective completion event, a random occurrence event, a character-death event, or the like), or any other action that may cause a displayed animation to transition to another animation.

At block 304, the game engine 152 identifies a current animation. Typically, the current animation is an on-going animation that is being displayed to a user. However, in some cases, the current animation may be a static image. For example, the character may not be in motion.

Based at least in part on the animation change trigger and the current animation, the game engine 102 selects or identifies a new animation at block 306. In, some embodiments, the new animation is selected based on the animation change trigger without consideration of the current animation.

At block 308, the pose matching controller 152 determines potential start frames of the new animation. The potential start frames may include a subset of frame of the new animation. Further, the potential start frames may be a range of frames that occur at the start of the new animation. For example, assuming the new animation includes some number of frames greater than five (such as, for example, 100, 500, or 1000 frames), the potential start frames could include frames 1 through 5 of the new animation. In some cases, the potential start frames may be non-sequential. For example, the start frames could be frames 1, 3, 5, or 7 of the new animation. In certain embodiments, the potential start frames may be dynamically determined based on the current animation and/or the animation change trigger. For example, suppose that the new animation is an animation of a character leaping from the ground and landing with his or her first striking the ground to create an earthquake attack. In a case where the user initiates the attack when the character is running, the potential start frames may include frames 1 through 10 that relate to the character beginning to jump. However, in a case where the user initiates the attack when the user is already in the air due, for example, to a previously initiated jump, the potential start frames may include frames 50 through 60 that relate to the character beginning his or her descent.

At block 310, the pose matching controller 152 identifies reference features for a current frame of the current animation. The reference features may relate to a portion of a character included in the current animation. The reference features may include any pose features for the character including, but not limited to, a position of one or more skeletal joints of the character, a velocity of one or more skeletal joints of the character, a angular velocity of one or more joints of the character, or the like.

For each potential start frame, the pose matching controller 152, at block 312, identifies reference features corresponding to the reference features of the current frame of the current animation. At block 314, for each of the potential start frames, the pose matching controller 152 calculates a score based on the reference features of the current frame and the corresponding reference features of the potential start frame. The score may be calculated as a weighted average of the difference between each of the reference features of the current frame and the corresponding reference features of the potential start frame. For example, a difference between a location of an ankle joint for the current frame and the potential start frame may be averaged with a distance between a location of a knee joint for the current frame and the potential start frame. Further, the weighted average may include differences between velocities of motion, of the joints as well as locations of joints in three-dimensional space. The reference features that have been, identified as more important than other reference features may be weighted differently in creating the weighted average. For example, a difference between a root node, such as, for example, a hip node, may be weighted more than a difference between leaf nodes, such as, for example, a toe node. Moreover, in certain embodiments, the acceleration or deceleration of movement of a node and/or the change in velocity of the node may be weighted differently based at least in part on the animation change trigger and/or the selected new animation. In certain embodiments, the weight to apply to difference reference points may be based at least in part on the selected new animation. In some cases, the weights or the reference points to evaluate may be identified in metadata, such as, for example, tags, associated with the new animation and/or the current animation.

The pose matching controller 152, at block 316, selects a start frame for the new animation from the potential start frames based at least in part on the corresponding score for each of the potential, start frames. In some cases, the start frame with the lowest score indicating the least difference between the current frame and the potential start frame of the new animation may be selected. However, as it is possible for other scoring algorithms to be used, it is possible that the selected start frame is the start frame with the highest score. In cases where two start frames are associated with the same score, the earlier frame in the animation sequence may be selected as the start frame. Alternatively, the later frame may be selected or one of the frames with the same score may be selected at random.

At block 318, the game engine 102 transitions from the current animation to the new animation using the selected start frame as an initial frame for the new animation. Advantageously, by selecting a start frame based at least in part on a current frame of a previous animation, a smoother transition between animations can be achieved. For example, suppose that the current animation is of a character walking and that the new animation is of the character running. If the running animation were to start at the same frame regardless of the state of the character's legs from the walking animation, the transition between the two animations may appear disjointed. For example, if the current frame of the walking animation includes the character lifting the left foot in a forward motion, and the start of the running animation includes the character lifting the right leg to start running, the animation transition would appear unnatural. Advantageously, by determining the start frame of the running animation based at least in part on the current frame of the walking animation, the transition between animations may appear more natural because, for example, the running animation can begin with the same leg in motion as was in motion during the walking frame or, alternatively, the opposite leg as the leg in motion if the motion has completed.

Second Example Pose Matching Process

Figure 4:
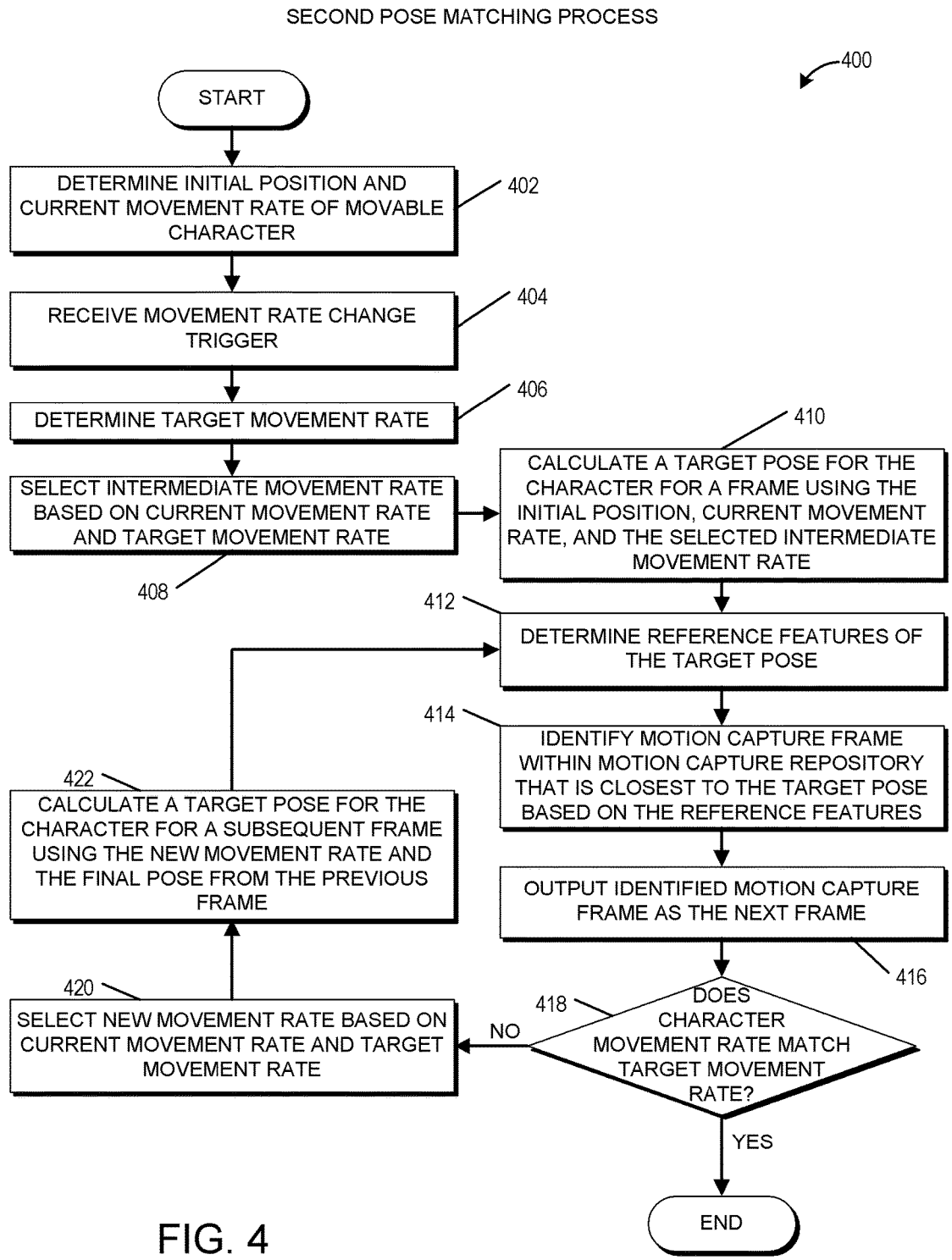
FIG. 4 presents a flowchart of an embodiment of an alternative pose matching process relating to a transition between animations.

FIG. 4 presents a flowchart of an embodiment of an alternative pose matching process relating to a transition event. The process 400 can be implemented by any system that can modify a visual display of character movement in response to a transition event, such as a command to start/stop running. For example, the process 400, in whole or in part, can be implemented by a game engine 102, a character movement engine 110, a collision detector 122, a physics engine 112, or a motion capture data repository 132, among others. Although any number of systems, in whole or in part, can implement the process 400, to simplify discussion, the process 400 will be described with respect to particular systems. Further, although embodiments of the process 400 may be performed with respect to any type of movable game object, to simplify discussion, the process 400 will be described with respect to a character within the game. This character may be a user controlled character or a non-player character (NPC).

In certain implementations, the process 400 may be used to improve blending between animations associated with one movement rate of a character and animations associated with another movement rate for the character. For instance, the process 400 may be used to transition between a walking animation and a running animation, which, in some cases, may occur in response to a user command. Further, in some implementations, the process 400 may be performed without using a physics engine 112.

The process 400 begins at block 402 where, for example, the game engine 102 determines an initial position and the current movement rate of a movable character. In some cases, the game engine 102 may use the character movement engine 110 to determine the initial position and the current movement rate of the movable character. In certain embodiments, block 402 may include one or more of the embodiments described with respect to block 202.

At block 404, the character movement engine 110 receives a movement rate change trigger. This movement rate change trigger can include any trigger that corresponds to a change in the rate of movement of a character. For example, the trigger may include a command to change a movement rate from a walking rate to a running rate or vice versa. As another example, the trigger may include movement from one type of environment to another type of environment, such as moving between land and water or between grass plains and sand.

At block 406, the character movement engine 110 determines the target movement rate. This target movement rate may be determined based at least in part on the received command, the characteristics of the environment from which the character left, and/or the characteristics of the environment in which the character entered.

The character movement engine 110, at block 408, selects an intermediate movement rate based on the current movement rate determined at block 402 and the target movement rate determined at block 406. This intermediate movement rate may also be based at least in part on an amount of time or a number of frames associated with transitioning between the initial movement rate and a final movement rate. For example, if a game is configured to run at 30 frames per second and a character is to transition from, running to walking within one second, then the number of movement rates to be used with the process 400 may be 30. In such cases, assuming a linear movement rate change, the intermediate movement rate for a first frame may be the initial movement rate plus ⅓₀ of the difference between the initial movement rate and the target movement rate. In other cases, the rate of change of movement may be nonlinear.

At block 410, the character movement engine 110 calculates a target pose for the character for a frame using the initial position, current movement rate, and the selected intermediate movement rate. In some embodiments, block 410 may include one or more of the embodiments associated with block 204. At block 412, the character movement engine 110 determines reference features for the target pose. In some embodiments, block 412 may include one or more of the embodiments associated with block 210.

The character movement engine 110, at block 414, identifies a motion capture frame within the motion capture data repository 132 that is closest to the target pose based on the reference features determined at block 412. In some embodiments, the block 414 may take into account weights for one or more of the reference features. Further, in some embodiments, block 414 may perform a multistage motion capture frame identification process based on identifying a particular cluster of motion capture frames within the motion capture data repository 132 and then identifying a motion capture frame within the cluster of motion capture images. In some embodiments, block 414 may include one or more embodiments described with respect to block 212.

At block 416, the character movement engine 110 outputs the identified motion capture frame as the next frame. At decision block 418, the game engine 102 determines whether the character movement rate matches the target movement rate. If it is determined that the character movement rate does match the target movement rate at the decision block 418, the process 400 may end.

If it is determined at the decision block 418 that the character movement rate does not match the target movement rate, they character movement engine 110 selects a new movement rate based at least in part on the current movement rate in the target movement rate. Selecting the new movement rate may include selecting a new intermediate movement rate as described with respect to block 408.

At block 422, the character movement engine 110 calculates a target pose for the character for a subsequent frame using the new movement rate and, the final pose from the previous frame as output at block 416. After calculating a new target pose at block 422, the process 400 may return to block 412 where the character movement engine 110 determines reference features for the new target pose calculated at block 422.

Advantageously, in certain embodiments, performing the process 400 prevents blending issues associated with other movement transition processes. For example, embodiments of the process 400 can eliminate nonrealistic poses by, for example, blending motion capture images frame by frame using the match closest to the target pose for each frame.

Example Motion Capture Repository Model Building

As is described in more detail below, in certain embodiments, animation clips or frames may be categorized and/or selected using a model developed using a machine learning algorithm. A variety of different types of models may be used with some embodiments of the present disclosure. For example, a parameter model may be generated based at least in part on historical data relating to the similarity between animation frames and the rate at which one or more frames are selected subsequent to the display of one or more other frames. The generated model may identify the reference features that are more likely to provide an indication of a subsequent frame to be displayed. These reference features may serve as the parameters for the generated model and may, in some cases, be weighted based on their impact in selecting the subsequent frame to be displayed. Further, the generated model may be used to determine a probability that a particular animation frame will provide the best or closest match to a currently displayed animation frame based on information relating to reference features of the animation frames.

As a second example, a parameter model may be generated based at least in part on historical data relating to the start frames that are selected for a subsequent animation given particular previously displayed animations. As with the previous model, the generated model may identify the reference features that are more likely to provide an indication of a start frame to be displayed for a new animation subsequent to a currently displayed animation. These reference features may serve as the parameters for the generated model and may, in some cases, be weighted based on their impact in selecting the start frame of a new animation to be displayed. Further, the generated model may be used to determine a probability that a particular animation frame will provide the best or closest match to a currently displayed animation frame based on information relating to reference features of the animation frames.

Some non-limiting examples of machine learning algorithms that can be used to generate and update parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

In some embodiments, the machine learning systems may be used to group various animation frames or clips together. By grouping or clustering animation frames, the process of identifying a subsequent animation frame or a start frame for a subsequent animation can, in some embodiments, be simplified, thereby reducing the amount of computing resources used to generate an animation or to transition to a new animation. Some example embodiments that apply machine learning algorithms and models are described further below and may be used to facilitate generating the motion capture repository.

Example Motion Capture Repository Generation Process

Figure 5:
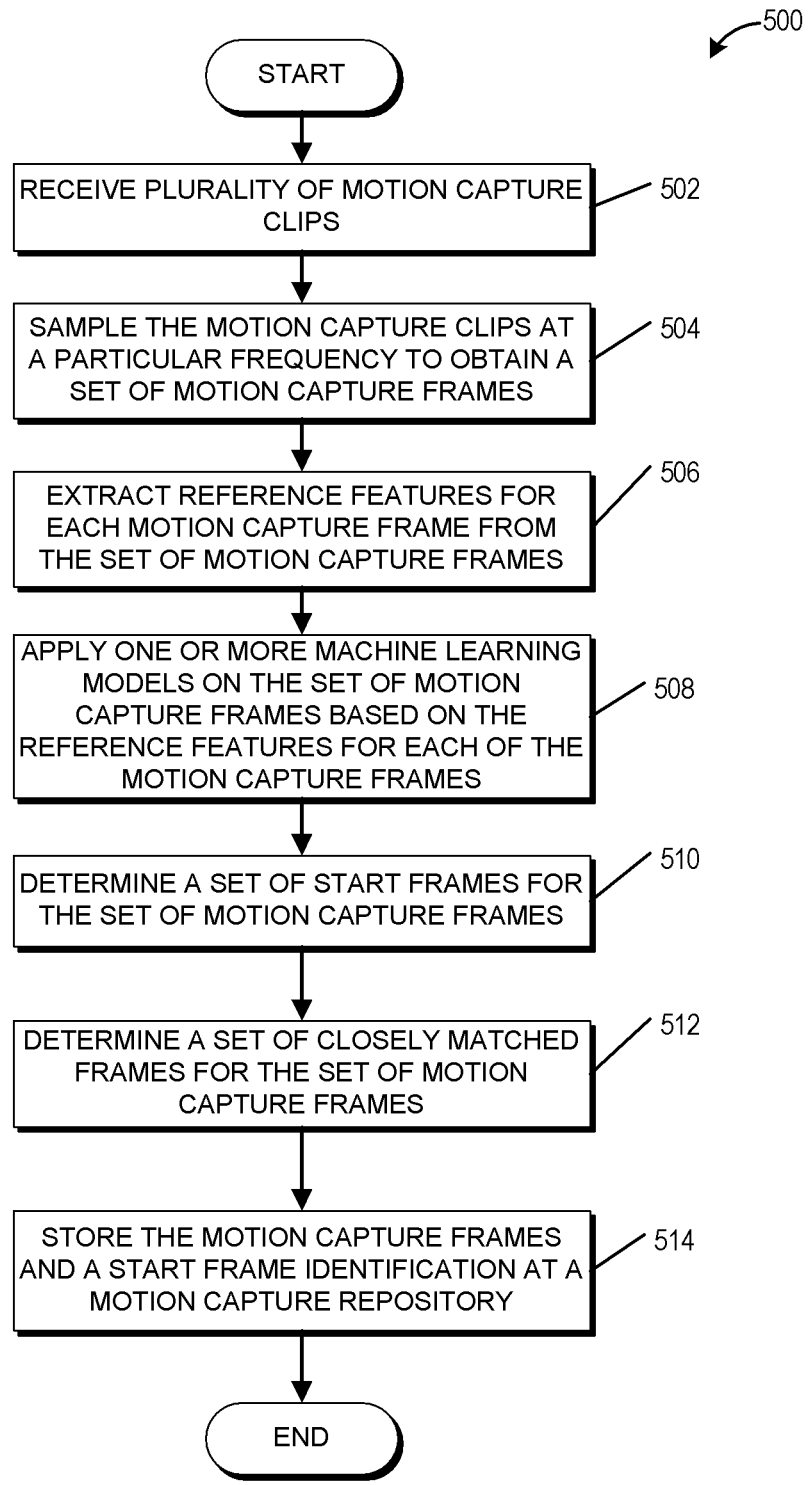
FIG. 5 presents a flowchart of an embodiment of a motion capture repository generation process.

FIG. 5 presents a flowchart of an embodiment of a motion capture repository generation process 500. The process 500 can be implemented by any system that can generate a repository of motion capture frames for use, for example, in a procedural animation generation process, such as the process 200, or in an animation transition process, such as the pose matching process discussed with respect to FIG. 3. For example, the process 500, in whole or in part, can be implemented by a motion capture computing system (not shown) configured to record motion capture data and to Windex or otherwise categorize the motion capture data as a set of motion capture clips or frames within a repository for inclusion in a game data repository, such as the motion capture data repository 132.

The process 500 begins at block 502 where, for example, a motion capture computing system receives a plurality of motion capture clips. These motion capture clips may be based on data obtained by using, for example, a motion capture suit, motion capture sensors, motion capture markers, motion capture marker or sensor location capturing devices, and/or image capturing devices configured to capture images of one or more actors in particular poses. The motion capture data may, in some cases, be mapped to one or more 3-D models to create motion capture clips or frames for use in a video game.

At block 504, the motion capture computing system samples the motion capture clips at a particular frequency to obtain a set of motion capture frames. For example, the motion capture clips may be sampled every 4, 5, 10, 15, or 30 frames, or at any other sampling rate. In some cases, the sampling rate may vary based on the particular animation clip or portion of the animation clip. The particular frequency may be identified by a user, such as a video game developer, or by a computing system based, at least in part, on a configuration of the computing system. For example, the sampling rate may be set based at least in part on a display rate supported by a graphics card of the computing system. The set of motion capture frames may include or may correspond to a set of character poses for a movable character.

At block 506, the motion capture computing system extracts reference features for each motion capture frame from the set of motion capture frames. Extracting the reference features may include extracting data associated with reference features identified by a user. Alternatively, or in addition, extracting the reference features may include extracting data for features identified by using, for example, a machine learning process, as having a threshold probability of identifying a particular frame within the set of motion capture frames. The reference features may include joints or other coordinate points on, a skeleton, model mesh, or other geometric feature or model that may be used to identify a position of a character or a pose of the character within the motion capture frame. Further, the data associated with the reference features may include location data, velocity data, acceleration data, or the like. Often, the identified set of reference points correspond to joints in a 3-D model depicted within the motion capture image. However, as stated above, in some cases, at least some of the set of reference points may correspond to other locations on the 3-D model.

At block 508, the motion capture computing system applies one or more models built using, for example, machine learning algorithms, on the set of motion capture frames based at least in part on the reference features for each of the motion capture frames. As noted above, to determine which frames should be selected as start frames and/or as close matches to a final frame, the machine learning algorithm can include any type of algorithm that can be used to determine which data points or reference features most likely indicate start frames and/or are close matches to other animation frames. In some cases, the application of the one or more machine learning models may result in clustering animation frames together. For example, the machine learning algorithm can include k-means clustering, canopy clustering, nearest centroid, and the like.

In some embodiments, the motion capture computing system, may generate a plurality of clusters of motion capture frames based on the application of the parameter models. In some cases, one or more of the clusters may include a single motion capture frame. In certain embodiments, multiple clusters may include a particular motion capture frame. For example, in cases where clusters are associated with particular animation events, such as falling, dying, and victory events, a particular motion capture frame may be included in multiple clusters. However, in other cases, a particular motion capture frame may be included in one particular cluster.

At block 510, the motion capture computing system determines a set of start frames for the set of motion capture frames. In some embodiments, the set of start frames may be identified by a user, Alternatively, or in addition, the set of start frames may be determined by applying a parameter model to determine a probability that particular frames are selected as start frames. In some embodiments, multiple sets of frames from the set of motion capture frames may be selected as start frames. In some such embodiments, each set of frames selected as start frames may be associated with different conditions that facilitate the selection of a set of start frames during a pose matching process. For example, one set of start frames may be tagged for use when a character in a previous animation is located on the ground within an environment and another set of start frames may be tagged for use when the character is located in the air within the environment.

In addition, or in the alternative, at block 512, the motion capture computing system may determine that particular frames are likely to match closest to frames of another animation. The closest matches may be determined by, for example, applying a prediction or parameter model to determine a probability that one or more particular frames are closes matches based at least in part on reference features associated with the frames. In some embodiments, the blocks 510 and/or 512 may be optional or omitted.

At block 514, the motion capture frames are stored along with a corresponding cluster identification, for each motion, capture frame and a start frame identification in a emotion capture repository. The start frame identification may indicate whether the particular frame is included in a potential set of start frames. Further, in some cases where a particular frame is identified as a particular start frame of an animation, the start frame identification may identify conditions when the particular start frame may be eligible as a start frame. For example, if the potential start frame is eligible as a start frame when a character is on the ground, but not when the character is in the air, then the start frame identification may include information indicating that the potential start frame is only eligible as a start frame when the character is on the ground. In some cases, the motion capture repository may be shared among multiple video games. Alternatively, the motion capture repository may be associated with a particular video game.

Advantageously, in certain embodiments, the motion capture repository may use less storage space than a repository of pre-generated animations that includes animations for each possible animation within a particular game. Further, by generating a repository of motion capture frames that may be used to generate procedural animations, a game can be designed to include a greater variety of animations by using the same amount or less storage space that a comparable game that uses pre-generated stored animations. In addition, by clustering the motion capture images, the process can more quickly identify a matching motion, capture frame compared to using a brute force matching algorithm. For example, the motion capture image identification process may include performing a tiered matching algorithm that first identifies a cluster and then subsequently refines the search process to identify a matching motion capture frame within the identified cluster of motion capture frames.

Overview of Computing System

Figure 6:
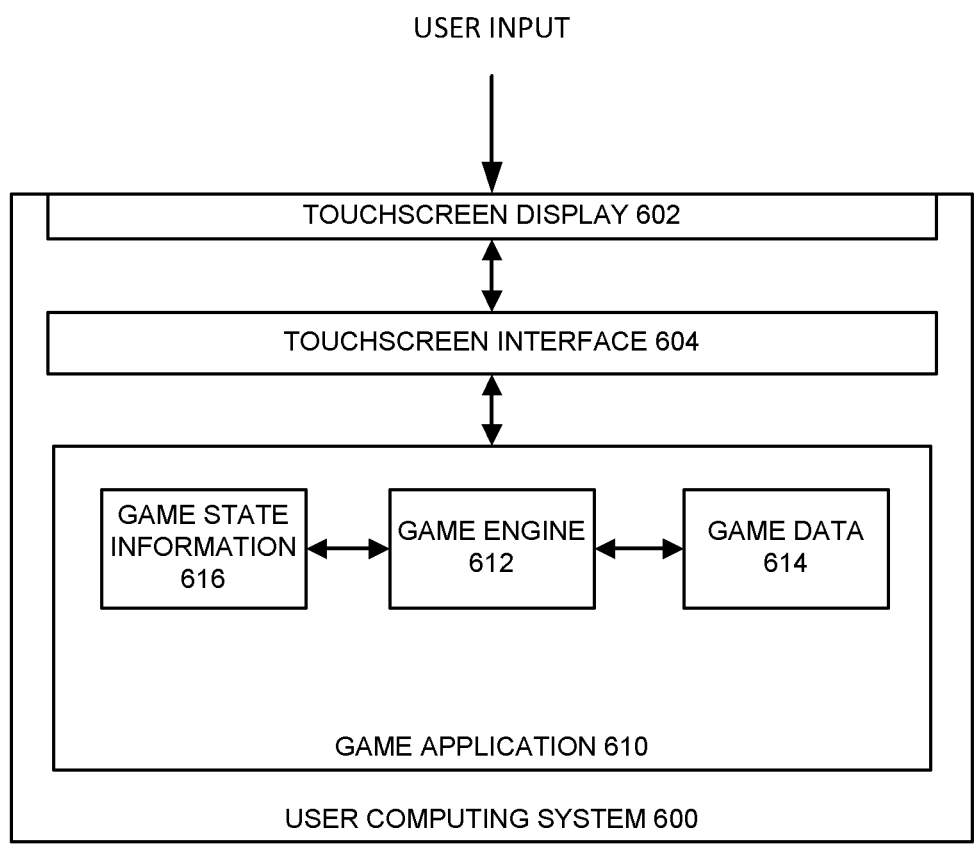
FIG. 6 illustrates an embodiment of a user computing system.

FIG. 6 illustrates an embodiment of a user computing system 600, which may also be referred to as a gaming system. As illustrated, the user computing system 600 may be a single computing device that can include a number of elements. However, in some cases, the user computing system 600 may include multiple devices. For example, the user computing system 600 may include one device that includes that includes a central processing unit and a graphics processing unit, another device that includes a display, and another device that includes an, input mechanism, such as a keyboard or mouse.

The user computing system 600 can be an embodiment of a computing system that can execute a game system, such as the game system 100 described with respect to FIG. 1. In the non-limiting example of FIG. 6, the user computing system 600 is a touch-capable computing device capable of receiving input from a user via a touchscreen display 602. However, the user computing system 600 is not limited as such and may include non-touch capable embodiments, which do not include a touchscreen display 602.

The user computing system 600 includes a touchscreen display 602 and a touchscreen interface 604, and is configured to execute a game application 610. This game application may be a video game or an application that executes in conjunction with or in support of the video game, such as a video game execution environment. Further, the game application may include one or more of the features described with respect to the game system 100. Although described as a game application 610, in some embodiments the application 610 may be another type of application that may include procedural animations based on motion capture data and/or that may transition between two different animations, such as educational software. While user computing system 600 includes the touchscreen display 602, it is recognized that a variety of input devices may be used in addition to or in place of the touchscreen display 602.

The user computing system 600 can include one or more processors, such as central processing units (CPUs), graphics processing units (GPUs), and accelerated processing units (APUs). Further, the user computing system 600 may include one or more data storage elements. In some embodiments, the user computing system 600 can be a specialized computing device created for the purpose of executing game applications 610. For example, the user computing system 600 may be a video game console. The game applications 610 executed by the user computing system 600 may be created using a particular application programming interface (API) or compiled into a particular instruction set that may be specific to the user computing system 600. In some embodiments, the user computing system 600 may be a general purpose computing device capable of executing game applications 610 and non-game applications. For example, the user computing system 600 may be a laptop with an integrated touchscreen display or desktop computer with an external touchscreen display. Components of an example embodiment of a user computing system 600 are described in, more detail with respect to FIG. 7.

The touchscreen display 602 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 602. The touchscreen interface 604 can be configured to translate the touch input into data and output the data such that it can be interpreted by components of the user computing system 600, such as an operating system and the game application 610. The touchscreen interface 604 can translate characteristics of the tactile touch input touch into touch input data. Some example characteristics of a touch input can include, shape, size, pressure, location, direction, momentum, duration, and/or other characteristics. The touchscreen interface 604 can be configured to determine the type of touch input, such as, for example a tap (for example, touch and release at a single location) or a swipe (for example, movement through a plurality of locations on touchscreen in a single touch input). The touchscreen interface 604 can be configured to detect and output touch input data associated with multiple touch inputs occurring simultaneously or substantially in parallel. In some cases, the simultaneous touch inputs may include instances where a user maintains a first touch on the touchscreen display 602 while subsequently performing a second touch on the touchscreen display 602.

The touchscreen interface 604 can be configured to detect movement of the touch inputs. The touch input data can be transmitted to components of the user computing system 600 for processing. For example, the touch input data can be transmitted directly to the game application 610 for processing.

In some embodiments, the touch input data can undergo processing and/or filtering by the touchscreen interface 604, an operating system, or other components prior to being output to the game application 610. As one example, raw touch input data can be captured from a touch input. The raw data can be filtered to remove background noise, pressure values associated with the input can be measured, and location coordinates associated with the touch input can be calculated. The type of touch input data provided to the game application 610 can be dependent upon the specific implementation of the touchscreen interface 604 and the particular API associated with the touchscreen interface 604. In, some embodiments, the touch input data can include location coordinates of the touch input. The touch signal data can be output at a defined frequency. Processing the touch inputs can be computed many times per second and the touch input data can be output to the game application for further processing.

A game application 610 can be configured to be executed on the user computing system 600. The game application 610 may also be referred to as a video game, a game, game code and/or a game program. A game application should be understood to include software code that a user computing system 600 can use to provide a game for a user to play. A game application 610 might comprise software code that informs a user computing system 600 of processor instructions to execute, but might also include data used in the playing of the game, such as data relating to constants, images and other data structures. For example, in the illustrated embodiment, the game application includes a game engine 612, game data 614, and game state information 616.

The touchscreen interface 604 or another component of the user computing system 600, such as the operating system, can provide user input, such as touch inputs, to the game application 610. In some embodiments, the user computing system 600 may include alternative or additional user input devices, such as a mouse, a keyboard, a camera, a game controller, and the like. A user can interact with the game application 610 via the touchscreen interface 604 and/or one or more of the alternative or additional user input devices. The game engine 612 can be configured to execute aspects of the operation of the game application 610 within the user computing system 600. Execution of aspects of gameplay within a game application can be based, at least in part, on the user input received, the game data 614, and game state information 616. The game data 614 can include game rules, prerecorded motion capture poses/paths, environmental settings, constraints, animation reference curves, skeleton models, and/or other game application information. Further, the game data 614 may include information that is used to set or adjust the difficulty of the game application 810.

The game engine 612 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 610, the game application 610 can store game state information 616, which can include character states, environment states, scene object storage, and/or other information associated with a state of execution of the game application 610. For example, the game state information 616 can identify the state of the game application at a specific point in time, such as a character position, character action, game level, attributes, and other information contributing to a state of the game application.

The game engine 612 can receive the user inputs and determine in-game events, such as actions, collisions, runs, throws, attacks and other events appropriate for the game application 610. During operation, the game engine 612 can read in game data 614 and game state information 616 in order to determine the appropriate in-game events. In one example, after the game engine 612 determines the character events, the character events can be conveyed to a movement engine that can determine the appropriate motions the characters should make in response to the events and passes those motions on to an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can conveyed to a renderer, which can generate a new frame for display to the user. The process can be repeated for rendering each frame during execution of the game application. Though the process has been, described in the context of a character, the process can be applied to any process for processing events and rendering the output for display to a user.

Example Hardware Configuration of Computing System

Figure 7:
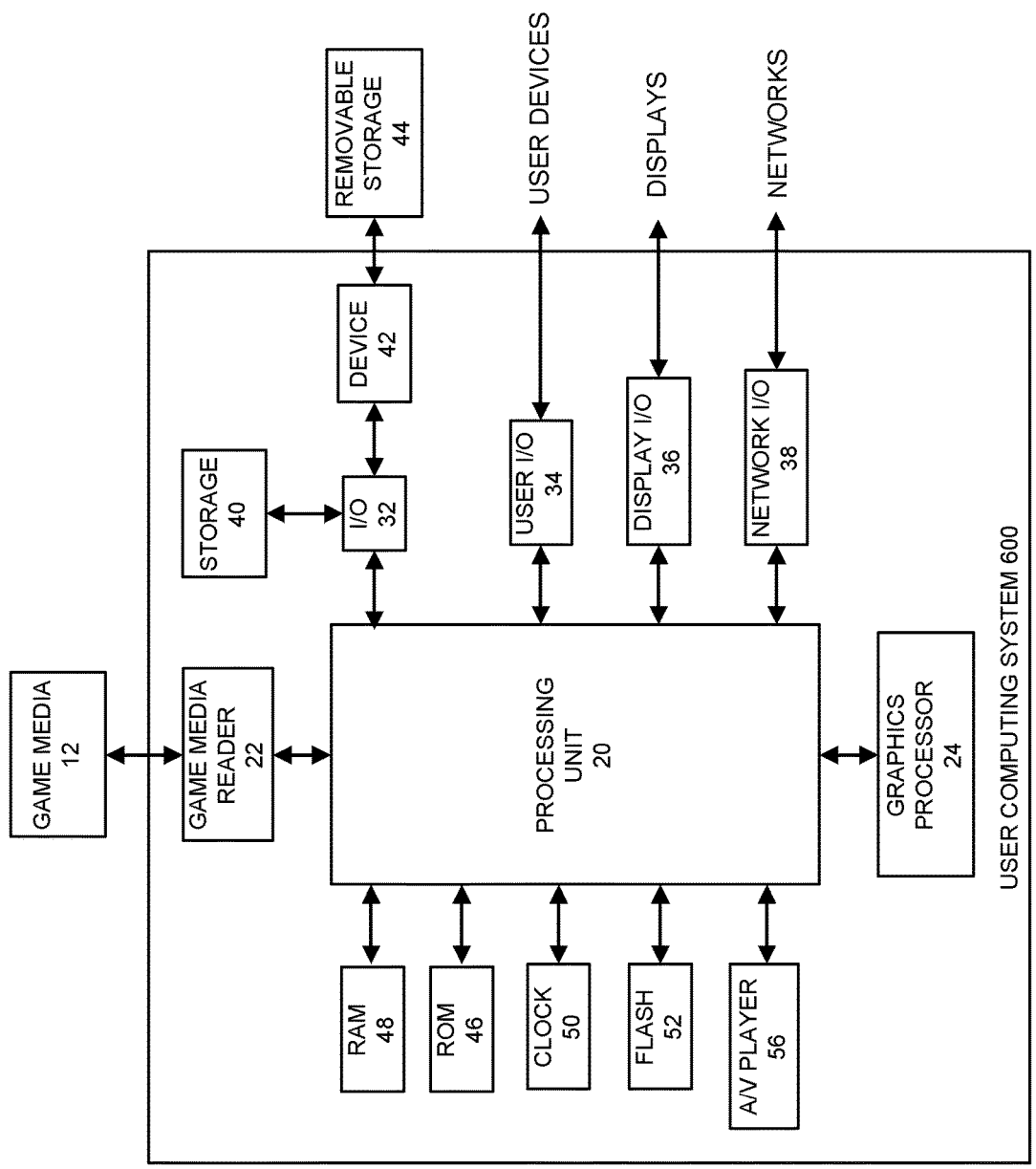
FIG. 7 illustrates an embodiment of a hardware configuration for the user computing system of FIG. 6.

FIG. 7 illustrates an embodiment of a hardware configuration for the user computing system 600 of FIG. 6. Other variations of the user computing system 600 may be substituted for the examples explicitly presented herein, such as removing or adding components to the user computing system 600. The user computing system 600 may include a dedicated game device, a smart phone, a tablet, a personal computer, a desktop, a laptop, a smart television, a car console display, and the like. Further, (although not explicitly illustrated in FIG. 7) as described with respect to FIG. 6, the user computing system 600 may optionally include a touchscreen display 602 and a touchscreen interface 604.

As shown, the user computing system 600 includes a processing unit 20 that interacts with other components of the user computing system 600 and also components external to the user computing system 600. A game media reader 22 may be included that can communicate with game media 12. The game media reader 22 may be an optical disc reader capable of reading optical, discs, such as CD-ROM or DVDs, or any other type of reader that can receive and read data from game media 12. In some embodiments, the game media reader 22 may be optional or omitted. For example, game content or applications may be accessed over a network via the network I/O 38 rendering the game media reader 22 and/or the game media 12 optional.

The user computing system 600 may include a separate graphics processor 24. In some cases, the graphics processor 24 may be built into the processing unit 20, such as with an accelerated processing unit (APU). In some such cases, the graphics processor 24 may share Random Access Memory (RAM) with the processing unit 20. Alternatively, or in addition, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard and which is sometimes referred to as an on-board graphics chip or device.

The user computing system 600 also includes various components for enabling input/output, such as an I/O 32, a user I/O 34, a display I/O 36, and a network I/O 38. As previously described, the input/output components may, in some cases, including touch-enabled devices. The I/O 32 interacts with storage element 40 and, through a device 42, removable storage media 44 in order to provide storage for computing device 600. Processing unit 20 can communicate through I/O 32 to store data, such as game state data and any shared data files. In addition to storage 40 and removable storage media 44, computing device 800 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O 34 can include touchscreen inputs. As previously described, the touchscreen can be a capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals may be produced by the display I/O 36 and can include signals for displaying visual content produced by the computing device 600 on a display device, such as graphics, user interfaces, video, and/or other visual content. The user computing system 600 may comprise one or more integrated displays configured to receive display output signals produced by the display I/O 36, which may be output for display to a user. According to some embodiments, display output signals produced by the display I/O 36 may also be output to one or more display devices external to the computing device 600.

The user computing system 600 can also include other features that may be used with a game, such as a clock 50, flash memory 52, and other components. An audio/video player 56 might also be used to play a video sequence, such as a movie. It should be understood that other components may be provided in the user computing system 600 and that a person skilled in the art will appreciate other variations of the user computing system 600.

Program code can be stored in ROM 46, RAM 48, or storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in storage 40, and/or on removable media such as game media 12 (which, can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the play of the game and portions thereof might also be reserved for frame buffers, game state and/or other data needed or usable for interpreting user input and generating game displays. Generally, RAM 48 is volatile storage and data stored within RAM 48 may be lost when the user computing system 600 is turned off or loses power.

As user computing system 600 reads game media 12 and provides a game, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as game media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can, include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such, as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method of dynamically and automatically generating animation during execution of an instance of a video game, the method comprising:
   as implemented, during execution of the instance of the video game, by an interactive computing system configured with specific computer-executable instructions,
   receiving an animation change trigger corresponding to an occurrence of an in-game event occurring during the execution of the instance of the video game, the animation change trigger causing a currently displayed animation displayed during the execution of the instance of the video game to be changed, wherein the currently displayed animation comprises a plurality of frames, and wherein the in-game event comprises a change to or an interaction with a first object within the video game;
   responsive to the animation change trigger, identifying a new animation based at least in part on the animation change trigger, a set of game rules, and the currently displayed animation, wherein the set of game rules are used to select the new animation from a plurality of animations based on a current state of the video game;
   determining dynamically and automatically during the execution of the instance of the video game a plurality of eligible start frames for the new animation, wherein the plurality of eligible start frames comprise a subset of frames of the new animation that are determined based at least in part on a current frame of the currently displayed animation and a context condition of the first object within the video game at a point in time corresponding to the animation change trigger;
   identifying reference features for the current frame of the currently displayed animation;
   selecting a start frame from the plurality of eligible start frames based at least in part on the reference features for the current frame and corresponding reference features from each eligible start frame from the plurality of eligible start frames; and
   transitioning the currently displayed animation to the new animation beginning with the selected start frame.

2. The computer-implemented method of claim 1, wherein the animation change trigger comprises a user input.

3. The computer-implemented method of claim 1, wherein the plurality of eligible start frames is identified based at least in part on a tag associated with the new animation.

4. The computer-implemented method of claim 1, wherein the reference features include one or more of the following: a joint position, a joint rotation, a reference feature velocity, or a mesh coordinate.

5. The computer-implemented method of claim 1, wherein selecting the start frame from the plurality of eligible start frames further comprises:
   for each eligible start frame, calculating a score based at least in part on the reference features for the current frame and the corresponding reference feature for the eligible start frame; and
   selecting the start frame based at least in part on the score associated with each of the eligible start frames from the plurality of eligible start frames.

6. The computer-implemented method of claim 5, wherein the score is based at least in part on a weighted difference between each reference feature of the current frame and the corresponding reference feature for the eligible start frame.

7. The computer-implemented method of claim 1, wherein the plurality of eligible start frames comprises non-sequential frames for the new animation.

8. The computer-implemented method of claim 1, wherein the plurality of eligible start frames comprises consecutive frames for the new animation.

9. The computer-implemented method of claim 1, wherein the in-game event comprises a collision between the first object and a second object in the video game.

10. The computer-implemented method of claim 1, wherein the first object comprises a character, an animate object, or an inanimate object.

11. The computer-implemented method of claim 1, wherein the context condition comprises a location of the first object within a video game environment or an action being performed by the first object.

12. The computer-implemented method of claim 1, wherein an occurrence of a different animation change trigger causes a determination of a different subset of frames of the new animation as the plurality of eligible start frames for the new animation.

13. A system comprising:
an electronic data store configured to store animation frames with respect to an application;
a hardware processor in communication with the electronic data store, the hardware processor configured to execute specific computer-executable instructions to at least:
receive, during execution of the application, an animation change trigger to transition from a first animation to a second animation, wherein the first animation is currently being displayed, and wherein the animation change trigger comprises a change to or an interaction with a representation of an animate or inanimate object within the application;
identify the second animation based at least in part on the animation change trigger, a set of game rules, and the first animation, wherein the set of game rules are used to select the second animation from a plurality of animations based on a current state of the application;
identify a reference feature for a displayed frame of the first animation;
identify, during execution of the instance of the application, a set of start frames for the second animation from a set of animation frames of the second animation stored in the electronic data store, wherein the set of start frames comprise a subset of frames of the second animation that are determined based at least in part on the first animation and a context condition of the animate or inanimate object within the application at a point in time corresponding to the animation change trigger;
compare the reference feature for the displayed frame with a corresponding reference feature for each start frame from the set of start frames to obtain a comparison result for each start frame from the set of start frames; and
select a start frame based on the comparison result for each start frame from the set of start frames.

14. The system of claim 13, wherein the animation frames comprise motion capture frames.

15. The system of claim 13, wherein the comparison result for each start frame comprises a score generated based at least in part on a difference between the reference feature for the displayed frame and the corresponding reference feature for the start frame.

16. The system of claim 13, wherein the hardware processor is further configured to execute specific computer-executable instructions to at least initiate display of the second animation with the start frame selected based on the comparison result.

17. The system of claim 13, wherein a number of the set of start frames comprises less than a number of the set of animation frames of the second animation.

18. A non-transitory computer-readable storage medium storing computer executable instructions that, when executed by one or more computing devices, configure the one or more computing devices to perform operations comprising:
detecting, during execution of an instance of a video game, an animation change trigger to transition from a first animation to a second animation, the animation change trigger corresponding to an occurrence of an in-game event occurring during execution of the instance of the video game, wherein the first animation is currently being displayed during execution of the instance of the video game, and wherein the first animation comprises a plurality of frames, and wherein the in-game event comprises a change to or an interaction with a character or inanimate object within the video game;
identifying the second animation based at least in part on the animation change trigger and a set of game rules, wherein the set of game rules are used to select the second animation from a plurality of animations based on a current state of the video game;
identifying a set of reference features for a displayed frame of the first animation;
identifying during the execution of the instance of the video game a set of start frames comprising a subset of frames for the second animation based at least in part on the first animation and a context condition of the character or inanimate object within the video game at a point in time corresponding to the animation change trigger; and
selecting a start frame from the set of start frames based at least in part on the set of reference features and a corresponding set of reference features for each start frame of the set of start frames.

19. The computer-readable, non-transitory storage medium of claim 18, wherein selecting the start frame further comprises:
calculating a weighted score for each start frame of the set of start frames, the weighted score based on a weighted difference between each reference feature from the set of reference features of the displayed frame and each corresponding reference feature from the corresponding set of reference features for the start frame to obtain a set of weighted scores; and
selecting at least one start frame associated with the lowest weighted score from the set of weighted scores.

20. The computer-readable, non-transitory storage medium of claim 19, wherein, when a plurality of start frames from the set of start frames is associated with the lowest weighted score, selecting the earliest start frame in a time sequence from the set of start frames associated with the lowest weighted score.

21. The computer-readable, non-transitory storage medium of claim 18, wherein the operations further comprise designating the start frame selected from the set of start frames as a subsequent frame to display subsequent to the displayed frame of the first animation.

* * * * *